United States Patent Office 3,446,930
Patented May 27, 1969

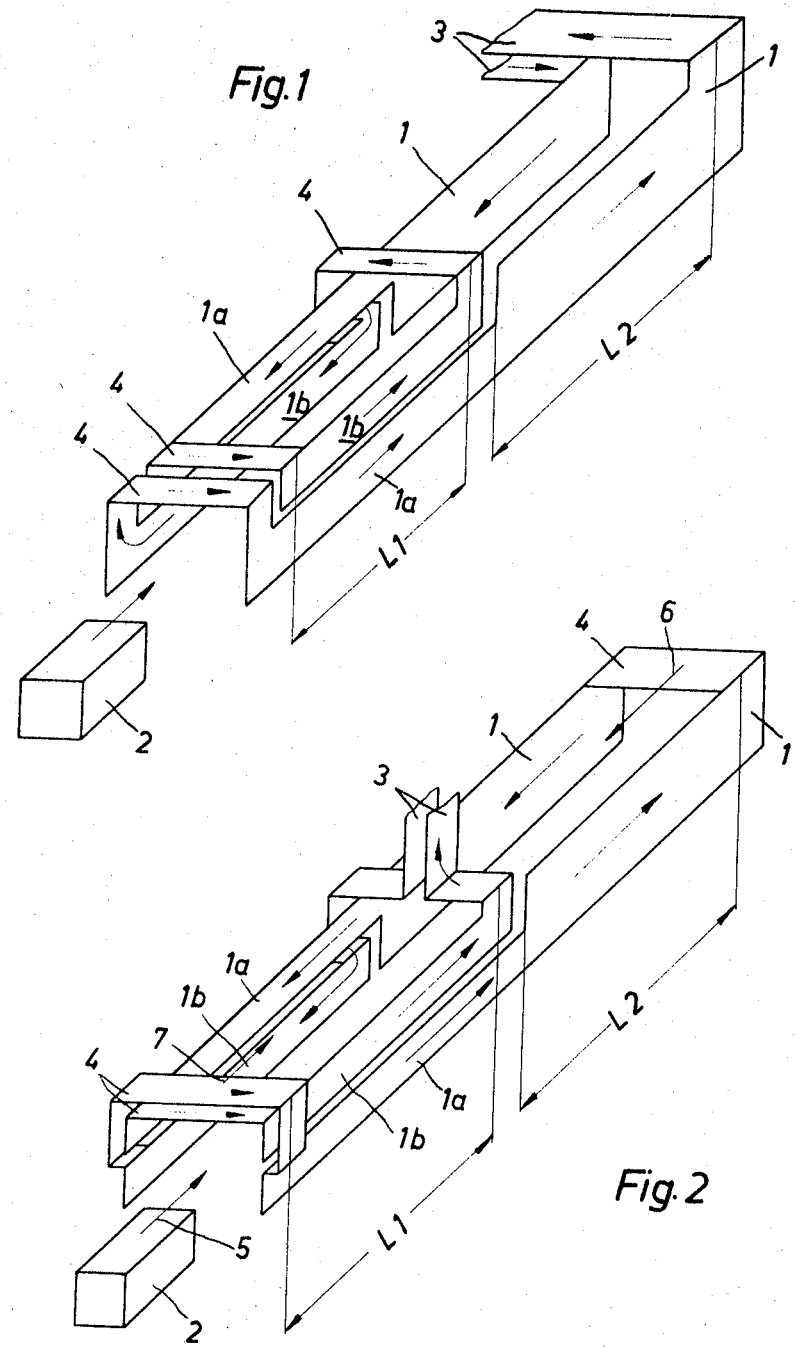

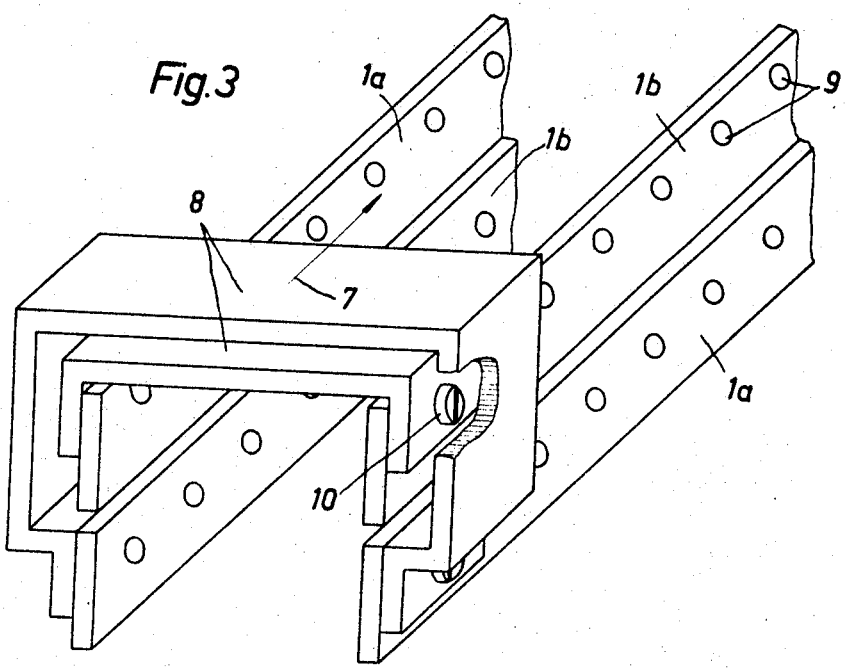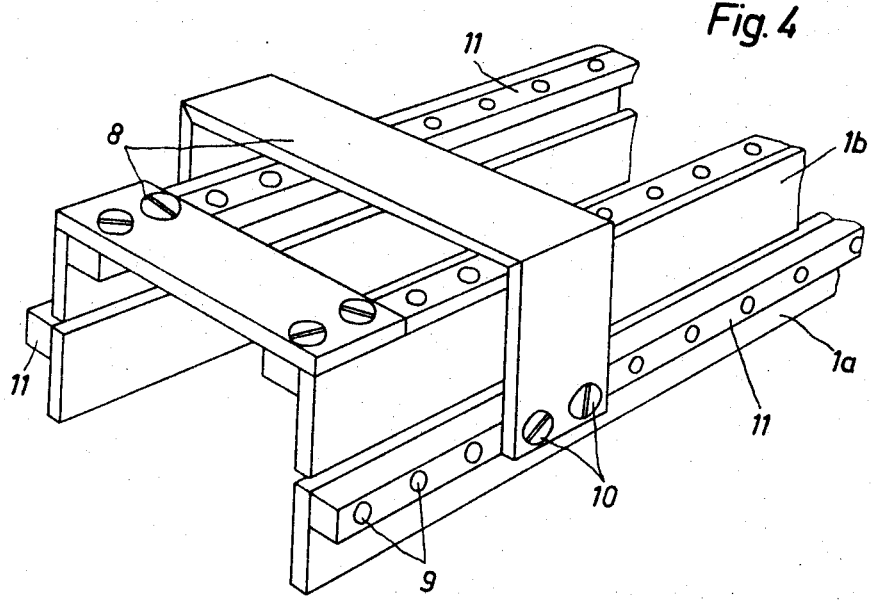

3,446,930
CROSS-FIELD INDUCTOR FOR HEATING ELECTRICALLY CONDUCTING WORKPIECES
Gerhard Seulen, Remscheid, Herbert Geisel, Remscheid-Luttringhausen, and Ernst Stangl, Remscheid-Reinshagen, Germany, assignors to AEG-Elotherm GmbH, Remscheid-Hasten, Germany
Filed Dec. 20, 1966, Ser. No. 603,368
Claims priority, application Germany, Dec. 22, 1965,
A 51,152; Nov. 8, 1966, A 54,029
Int. Cl. H05b 5/02
U.S. Cl. 219—10.69                                12 Claims

ABSTRACT OF THE DISCLOSURE

Inductor means for heating electrically conductive workpieces in a magnetic field generated thereby, divided into two inductors or inductor zones, both adapted to produce cross fields, one being comprised of multiple bars cross-connected so that the current will successively cross from a bar on one side and pass in the reverse direction along a bar on the other side of the gap formed between the bars on the two sides for the passage of the workpieces.

---

Figure 5:
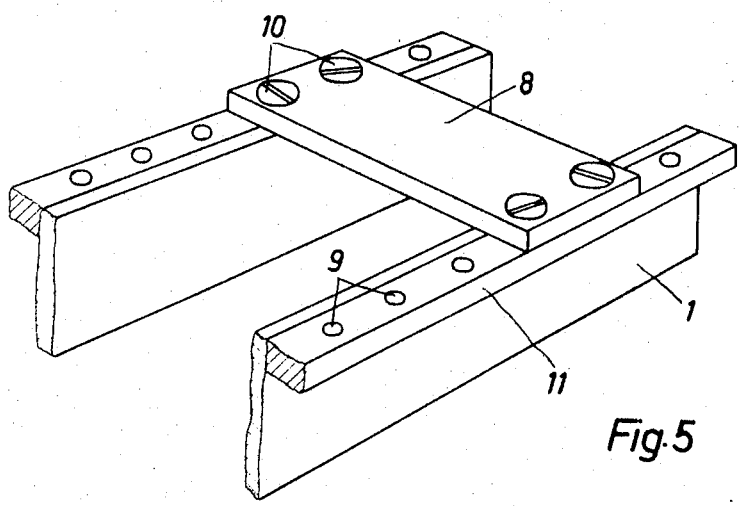

The invention relates to an arrangement for heating electrically conducting workpieces in an inductor generating a magnetic field across the path of travel of the workpieces which may be continuously or intermittently conveyed through the inductor.

For example, when round or square section stock is inductively heated to prepare it for a hot working treatment it is usually heated in a longitudinal magnetic field. The workpieces that are to be heated, such as small billets, are conveyed axially through water-cooled circular coils and their temperature is thus raised from room to forging temperature. Generally a medium frequency current is used for heating stock of average dimensions.

However, it has also been proposed to heat such workpieces in a crosswise field. The inductor used for such a purpose is constructed of parallel flat copper bars. The major rectangular faces of two such parallel bars face each other and they are suitably spaced to permit the workpieces, such as small billets, to be heated by conveying them through the passage between the two conductor bars. The conductor bars are cross-connected at one end and at the other ends (the unconnected ends) are connected through a transformer to a current source, such as a medium frequency generator.

The longitudinal field inductor (circular coil) has the advantage over a cross-field inductor that it heats the work much more quickly. The heating currents flow under the entire peripheral surface of the workpieces and the heat can therefore symmetrically penetrate radially to the core. In a cross-field inductor the heating currents flow only along the sides of the workpiece cross section which face the two conductor bars. Consequently the rate at which the workpieces are soaked with heat is much slower. Moreover, when heating ferromagnetic workpieces in a constant longitudinal field, the power absorbed by the workpieces before they reach the magnetic change-over point (Curie point) is substantially greater than when this temperature has been exceeded. The surface therefore assumes this temperature quickly and heat penetration is thereby accelerated. On the other hand, the electrical efficiency of a longitudinal field inductor is not as good as that of a cross-field inductor.

It is the object of the present invention to provide a cross-field inductor which is free from the above mentioned defects. The invention solves this problem by providing two cross-field inductors, or inductor zones, preferably of different lengths which are electrically connected in series to the current source, the conductor bars of the inductor at the stock entry zone being interspersed and connected in series so that the current flow will be along an extended successively reversing path. As a result of this step the cross-field inductor at the end zone at which the stock that is to be heated enters, generates a magnetic field of greater intensity. The stock therefore absorbs more energy in this zone and consequently heats up very quickly.

In the said entry zone the cross-field inductor has conductor bars narrower than the bars in the other (outlet) zone, e.g., bars that are only half as wide as the conductor bars of the longer inductor at the said other zone. However it is often necessary to use the same conductor equipment for treating stock of different cross sectional shapes and to contrive the inductive heating equipment in such a way that despite a uniform cross sectional shape a differential rate of throughput of the heated material can be achieved. For this purpose the constant length of the cross-field inductors is not optimally designed because in such a case it could not be adapted to perform different kinds of work without incurring considerable electrical and thermal loss.

For example, if it were desired to reduce the rate of throughput of workpieces of fixed dimensions the heating power fed to a cross-field inductor of fixed length would have to be reduced. However, since the thermal losses would be nearly the same, the overall efficiency of the inductor would be correspondingly less.

These drawbacks may be avoided with an inductor according to the invention, by locating the connections for supplying the current at the junction between the two zones and by so connecting the cross connecting bridge members to the cross-field inductors or the conductor bars, that they can be easily detached.

The invention will be hereinafter illustratively and more particularly described with reference to the accompanying drawings in which FIG. 1 is a schematic perspective view of the novel arrangement of a cross-field inductor, whereas FIG. 2 is a modification of this form of construction, FIGS. 3 and 4 are likewise perspective representations which show the manner in which the cross connecting bridge members may be contrived at the stock entry end where the conductor bars are interlaced.

Figure 6:
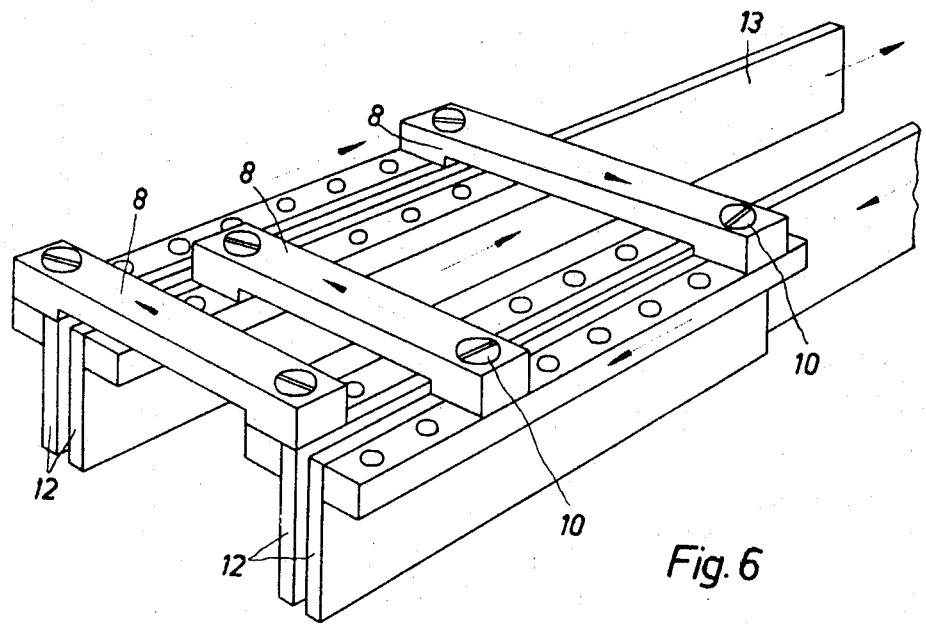

FIG. 5 reveals the construction of the bridge members at the stock entry end into the inductor, and FIG. 6 exemplifies a slightly modified form of construction of the proposed heating equipment in which the conductor bars at the stock entry end are likewise pluralized but placed side by side.

The cross-field inductor in FIG. 1 comprises preferably water-cooled conductor bars 1 which extend in parallel and relatively spaced to permit the stock, for instance in the form of small billets 2, to be conveyed through the intervening channel to be heated therein to the temperature needed for forging. The current supply from a suitable source of A.C. is via feeder connections indicated at 3.

In order to generate a higher magnetic field intensity at the stock entry end in region L, than in region $L_2$, the conductor bars are pluralized, see 1a and 1b at each side, cross connecting bridge members 4 providing bridging connections between opposite sides.

In the illustrated example the arrangement is such that the conductor bar sections 1a and 1b are each slightly less than half as wide as the conductor bar sections 1. The direction of current flow through the conductor bars during one half current cycle is indicated by arrows. Because of this arrangement the magnetic field intensity in zone $L_1$ is about twice as high as in the zone $L_2$. Power absorption is correspondingly higher and the total length of the inductor $L_1$ plus $L_2$ in the direction of travel is therefore less than that which would be required in the case of a conventional inductor. This incidentally has a favourable effect on the thermal efficiency which for the same throughput is the higher the smaller the surfaces of the workpieces within the heating range of the inductor. Conductors in zone $L_1$ might be repeatedly interspersed.

Moreover, in the illustrated embodiment the section $L_1$ is shorter than the section $L_2$ and the inductor will generally be thus designed. However, circumstances may arise in which it would be desirable to make the two sections equally long or even to make the section $L_1$ the longest. Allowance can thus be made for any unusual circumstances.

In FIG. 2 the conductor bars 1 of the component inductors $L_1$ and $L_2$ are likewise clearly seen, the current in a given half cycle flowing through the bars in the arrowed direction. The entry end for the stock is indicated by a workpiece 2 which is about to be conveyed through the cross field inductor as shown by arrow 5. At the stock entry end the component inductor $L_1$ is divided into two conductor bars 1a and 1b of which one is located above the other. These conductor bars are fed from feeder connections 3 and they are electrically connected in series and interspersed. The conductor bars on opposite sides of the heating channel are interconnected by cross connecting bridge members 4 which in FIG. 2 are shown to be fixed, but which are intended to be adjustably movable in the directions of the two arrows 6 and 7.

FIG. 3 exemplifies the manner in which this desired adjustability can be provided in practice. At regular intervals the conductor bar sections 1a and 1b are provided with holes or tapped bores 9 for the reception of screws 10 whereby the suitably shaped bridge members 8 can be securely affixed to the bars. Whenever desired the effective length of the cross field inductor can thus be shortened by undoing the screws 10, moving the bridge members 8 in the direction of arrow 7 and then bolting them to the conductor bars 1a and 1b by making use of a fresh set of holes.

The form of construction shown in FIG. 3 is suitable for many practical applications because it is of simple construction, apart from the slightly complex shape of the cross-over bridges 8. However, in an embodiment such as that in FIG. 3 it is difficult in case of need to provide the conductor bars with sheet metal magnet yokes should these be required for improving the configuration of the magnetic field. Furthermore, in many instances difficulties which could be avoided arise in providing the copper conductor bars of the heating inductor itself with holes, since they are preferred to be hollow for the purpose of permitting them to be cooled with a liquid.

In such a case it is better to choose a form of construction such as that shown in FIG. 4. In this arrangement the conductor bars 1a and 1b are armed on their insides or outsides with ledges 11 which are likewise provided at regularly spaced intervals with tapped holes 9 for the reception of countersunk screws 10 for the affixation of crossover bridges 8 of simpler shape. The disposition of the electric cross-connecting bridge member at the stock exit of the cross field inductor in an arrangement corresponding to FIG. 4 is shown in FIG. 5. The conductor bar 1 is here likewise provided with a ledge 11 containing tapped holes 9 for securing the cross-over bridge 8 by means of countersunk screws 10.

Another laternative which is mechanically even simpler to provide and which makes use of interchangeable bridge members 8 is shown in FIG. 6. The conductor bars are likewise interlaced at the stock entry end but the interspersed conductors 12 as well as the non-interspersed conductors 13 have the same width and they are placed side by side. The shape of the bridge members 8 is therefore particularly simple and their arrangement is also clear to appreciate. By undoing the screws 10 they can be easily removed or interchanged. The arrows in FIG. 6 indicate the path of the current through the copper conductors during a given current half cycle.

What we claim is:
1. A cross-field inductor means for rapidly and evenly overall-heating electrically conducting workpieces, comprising:
   electrically series-connected plate-like conductor bars between which said workpieces can be conveyed;
   said bars being disposed parallel to one another and being capable of being traversed by an alternating current and generating a transverse magnetic field to induce currents in the metal workpieces while these are being so conveyed;
   and the improvement which comprises the said conductor bars being divided into two longitudinal regions, one of which forms the workpiece entry and the other the following region;
   the region at the workpiece entry end comprising at each side a plurality of conductor bars of reduced cross-sections in relation to the cross-sections of the bars in the said following region, all of the said conductor bars being electrically connected in series with respect to each other.
2. A cross-field inductor means according to claim 1 in which the two said zones are of different lengths.
3. Cross-field inductor means according to claim 1, in which opposed bars form one of the said zones and the other of said zones constituting that at which the workpiece enters the inductor means is constituted of cross-connected bars, a plurality of which is associated with each of said opposed bars, and which are of substantially only one-half the width of the opposed bars.
4. Cross-field inductor means according to claim 1, comprising current feed and take-off connections located at the junction between the two said zones.
5. Cross-field conductor means according to claim 1, comprising conductor bars with detachable and longitudinally adjustable cross-connecting members.
6. Cross-field inductor means according to claim 5, in which the bars are equipped with ledges provided with holes and the said cross-connecting members are screwed to the said ledges.
7. Cross-field inductor means according to claim 6, in which said ledges are fixed on the inside of at least certain of the said bars.
8. Cross-field inductor means according to claim 6, in which said ledges are fixed on the outside of at least certain of the said bars.
9. In a cross-field inductor means for heating electrically conductive workpieces conveyed therethrough, the improvement wherein the said means comprise:
   different cross-field inductor zones electrically series connected;
   and wherein the inductor zone constituting that at which the workpiece enters the inductor means is constituted by interspersed bars connected in series so that the current will flow along an extended successively reversing path;
   and wherein opposed bars form one of the said zones and the other of said zones constituting that at which the workpiece enters the inductor means is con- stituted of cross-connected bars, a plurality of which are associated with each of said opposed bars, and which are substantially only one-half the width of the opposed bars.

10. In a cross-field inductor means for heating electrically conductive workpieces conveyed therethrough, the improvement wherein the said means comprise:

different cross-field inductor zones electrically series connected;

and wherein the inductor zone constituting that at which the workpiece enters the inductor means is constituted by interspersed bars connected in series so that the current will flow along an extended successively reversing path;

wherein the said means include conductor bars with detachable and adjustable cross-connecting members in which said bars are equipped with ledges provided with holes and the said cross-connecting members are attachable to the said ledges.

11. Cross-field inductor means according to claim 10, in which said ledges are fixed on the inside of at least certain of the said bars.

12. Cross-field inductor means according to claim 10, in which said ledges are fixed on the outside of at least certain of the said bars.

References Cited

UNITED STATES PATENTS

| 2,708,704 | 5/1955 | Duda | 219—10.79 |
| 3,301,991 | 1/1967 | Geisel et al. | 219—10.79 |
| 3,005,893 | 10/1961 | Dixon et al. | 219—9.5 |

FOREIGN PATENTS 970,800  10/1958  Germany.

OTHER REFERENCES

German printed application 1,045,011, Nov. 27, 1958.

Curtis: High Frequency Induction Heating, McGraw-Hill Book Co. Inc., New York, 1950, p. 116, Fig. 3–66.

RICHARD M. WOOD, *Primary Examiner.*

L. H. BENDER, *Assistant Examiner.*

U.S. Cl. X.R.

219—10.71, 10.79